United States Patent [19]

Schultheis et al.

[11] Patent Number: 5,479,715
[45] Date of Patent: Jan. 2, 1996

[54] ELECTRONIC LEVEL DISPLAYING INCLINATION USING A MULTI-SEGMENT FAN-LIKE DISPLAY

[75] Inventors: Gary R. Schultheis, Los Gatos; Charles E. Heger, Saratoga, both of Calif.

[73] Assignee: Zircon Corporation, Campbell, Calif.

[21] Appl. No.: 277,058

[22] Filed: Jul. 19, 1994

[51] Int. Cl.$^6$ ..................................................... G01C 9/06
[52] U.S. Cl. ............................. 33/366; 33/391; 364/559
[58] Field of Search ............................. 33/365, 366, 391; 364/559

[56] References Cited

U.S. PATENT DOCUMENTS

| | | | |
|---|---|---|---|
| 3,354,554 | 11/1967 | Panerai et al. | 33/366 |
| 3,378,932 | 4/1968 | Neill | 33/366 |
| 4,912,662 | 3/1990 | Butler et al. | 364/559 |
| 5,083,383 | 1/1992 | Heger | 33/366 |
| 5,136,784 | 8/1992 | Marantz | 33/366 |
| 5,191,713 | 3/1993 | Alger et al. | 33/366 |
| 5,259,118 | 11/1993 | Heger | 33/366 |
| 5,313,713 | 5/1994 | Heger et al. | 33/366 |

FOREIGN PATENT DOCUMENTS

WO94/04888  3/1994  WIPO ..................................... 33/366

*Primary Examiner*—Christopher W. Fulton
*Attorney, Agent, or Firm*—Skjerven, Morrill, MacPherson, Franklin & Friel; Norman R. Klivans

[57] ABSTRACT

An electronic level includes a visual scale having a "fan-like" configuration of a number of elongated wedge-shaped segments. The inclination of the device is shown by graphically illuminating various of the segments on either side of a central segment line. When the device is at a null (typically level or plumb) only the central segment is illuminated. Each segment indicates a predetermined amount of inclination from the null.

14 Claims, 5 Drawing Sheets

FIG. 4B they are not the inclination measurements used
ELECTRONIC LEVEL DISPLAYING INCLINATION USING A MULTI-SEGMENT FAN-LIKE DISPLAY

BACKGROUND OF THE INVENTION

1. Field of the Invention

This invention relates to an electronic level and specifically to the visual display and calibration of the level.

2. Description of the Related Art

Electronic levels known in the art include that sold by Wedge Innovations Inc. and as disclosed in U.S. Pat. No. 4,912,662 issued Mar. 27, 1990 to Butler et al. (assigned to Wedge Innovations Inc.). Such prior art electronic levels display show the inclination in degrees or percent slope, which are typically not the inclination measurements used by building tradesmen or others.

Prior art devices thus often do not provide a satisfactory indication of deviation from level or plumb in a useful manner.

An electronic level disclosed in International (PCT) Patent Application No. PCT/US93/07434 published Mar. 3, 1994 having International Publication Number WO94/04888 and entitled "Electronic Level . . .", invented by Charles E. Heger et al. (docket no. M-2167-1P PCT), includes a graphical display of rise over run (deviation from a null) in inches per the actual length of the level instrument (such as two or four feet). The display includes a number of parallel line segments resembling a typical ruler scale as the primary indication. When the device is at a null (level or plumb or at some other preselected inclination), only the central line segment is illuminated. When the device is inclined at an angle from the null, one or more of the line segments are illuminated starting from the center line segment. The more line segments that are illuminated starting from the center line segment, the greater the amount of inclination indicated. Each line segment in one embodiment indicates 1/64th inch of additional inclination per horizontal foot. The line segments on either side of the central line segment thus provide an indication of inclination in either direction, i.e. that the left end or right end of the device is inclined. Additionally, numerals associated with the scale show the amount of inclination per arbitrary length (such as two feet or four feet) related to the instrument length. Also included is a slope indicator and a numerical indicator for indicating a fixed offset mode.

Also included is a direction of rotation indicator for showing by means of arrows and associated line segments in which direction one must rotate the device to achieve the null position.

However, these earlier devices do not fully solve the problem of an easily read and intuitively understood display providing a graphic depiction of the amount and direction of derivation from null.

SUMMARY OF THE INVENTION

In accordance with the invention, a display for an electronic level device includes a number of illuminated non-parallel and adjacent display segments, each segment being of an extended wedge shape and representing a predetermined increment of inclination. The segments are arranged at a sequence of angles relative to a longitudinal axis of a housing of the level device. The segments therefore define a fan-like configuration extending on both sides of the longitudinal axis. For any one particular degree of inclination (except at a null position), segments on both sides of the axis are illuminated as in the central (null position) segment to provide a symbolic reference to the longitudinal axis of the level. If the level device is at a null position (level of plumb) only the central segment is illuminated. In another embodiment the central segment is illuminated only at a null position of the level, thus emphatically indicating level or plumb.

An easily readable visual indication is provided of the amount of deviation from the null position by this intuitively understood graphic (non-numeric) display, which also graphically indicates in which direction, i.e. clockwise or counterclockwise, the level should be rotated to reach the null position. The further away from the null position, the more segments are illuminated. Additionally a tone generator provides an audible indication of the level or plumb condition.

To improve level performance a digital moving average filter takes a moving average of the N most recent inclination values, and provides that value as the measured inclination. Additionally, a weighted display technical allows assignment of a variable number of processing "bins" (ranges of inclination) to each display segment, thus allowing a wide display range which is accurate at its center.

DETAILED DESCRIPTION OF THE INVENTION

The level disclosed herein includes improvements over the level disclosed in commonly owned U.S. Pat. No. 5,083,383 issued Jan. 28, 1992 to Charles E. Heger and entitled "Electronic Capacitance Level With Automatic Electrode Selection". Also, certain features of the level disclosed in commonly owned U.S. patent application Ser. No. 07/810,739 filed Dec. 18, 1991 and entitled "Electronic Level With Display, . . .", now U.S. Pat. No. 5,259,118, issued Nov. 9, 1993, invented by Charles E. Heger are used herein. Each of these patent documents is incorporated herein by reference. A capacitive sensing system in accordance with the present invention is described in U.S. Pat. No. 5,083,383 and therefore is not further described here. Also, the present level has many common features to that disclosed in U.S. Pat. No. 5,313,713, incorporated by reference.

Display

Figure 1A:
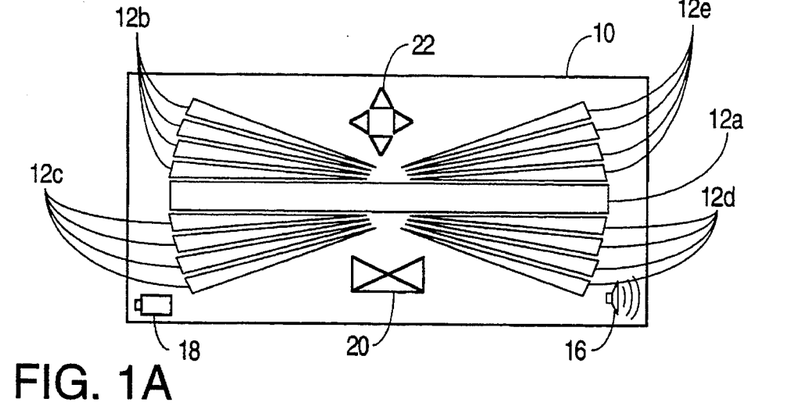
FIGS. 1A, 1B, 1C, 1D, show level displays in accordance with the invention.

FIG. 1A shows all of the segments of display 10 of the level in accordance with the invention. It is to be understood that display 10 is conventionally mounted on a convenient outer surface of the level housing, the mechanical structure of which is typical of that used in electronic levels which are commercially available, for instance from Wedge Innovations and Zircon Corporation.

Display 10 includes a central level (or plumb) indicator segment 12a and a plurality of inclination indicator segments arranged in a fan-like configuration on either side of the central segment 12a. In this embodiment, there are four inclination segments in each group 12b, 12c, 12d, 12e. The segments in groups 12b, 12d operate in conjunction (as described below), as do the segments in groups 12c and 12e. Thus while sixteen inclination indicator segments are shown in FIG. 1A, these comprise only eight actual inclination indicators. It is to be understood that in another embodiment only the segments in e.g. groups 12b, 12c (to the left-hand portion of display 10) are present; the other two groups 12e, 12d are thus functionally redundant but provide additional visual emphasis. Also included on display 10 are conventional beeper (loudspeaker) volume icon 16, a low battery icon 18, and calibration icon 22 which includes four small triangles and two numerals (not shown), the operation of which is described below.

Figure 1B:
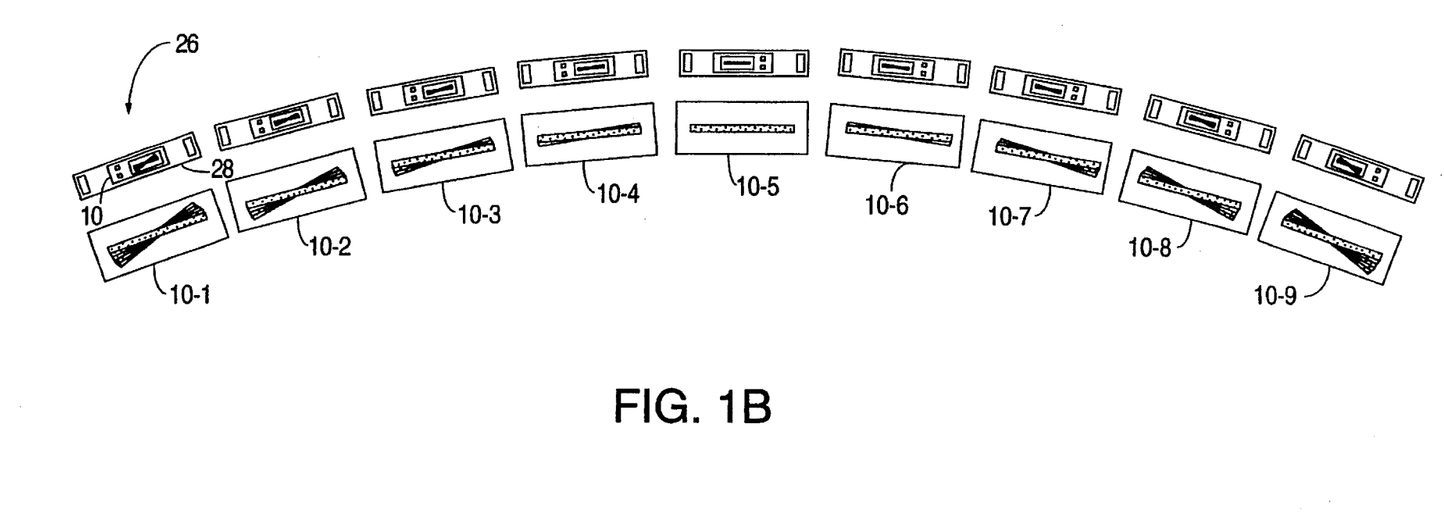

The use of display 10 of FIG. 1A is illustrated in FIG. 1B which illustrates, in the upper row, a plurality of positions of the level 26, where level 26 includes the display 10 mounted on conventional level housing 28. (It is to be understood that level 26 is shown here only diagrammatically and the amount of inclination is exaggerated in FIG. 1B.) FIG. 1B shows level 26 in nine positions relative to the direction of the earth's gravitational field, with the central position being the level position and the other positions on either side of the level position being varying degrees of inclination. Immediately below each depiction of level 26 is the corresponding appearance of display 10, showing the fan-like configuration of the central and inclination segments 12a, 12b, 12c, 12d, 12e (not labeled in FIG. 1B). As shown in the central position of level 26, the corresponding display 10-5 has only the central segment 12a illuminated. The furthest degree of inclination is shown in displays 10-1 and 10-9. Thus in display 10-1 level 26 is rotated in the counterclockwise direction, and display 10-9 correspondingly shows level 26 rotated in the clockwise direction about a central vertical axis. The other displays 10-2, 10-3, 10-4, and 10-6, 10-7, 10-8 show intermediate degrees of inclination. It can be seen that this readily provides an intuitive graphical indication of the amount of inclination of the level.

Figure 1C:
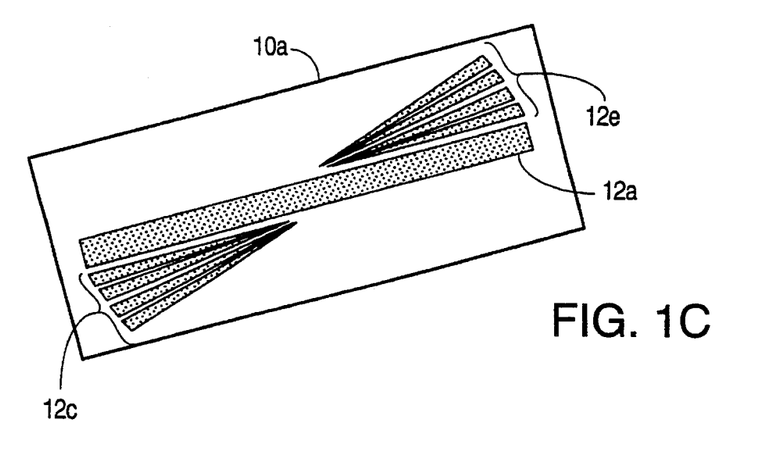

FIG. 1C shows detail of display 10, here designated 10a, corresponding to display 10-1 of FIG. 1B, at the maximum inclination with each segment in groups 12c, 12e and central segment 12a illuminated.

Figure 1D:
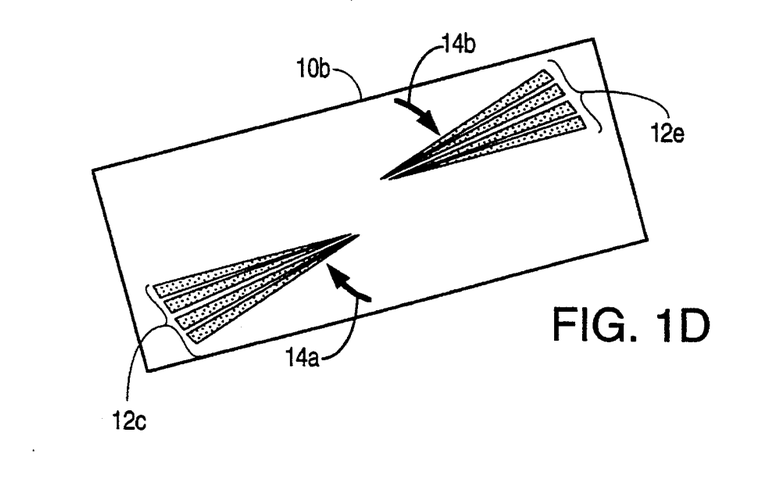

Another embodiment is shown in FIG. 1D with the central segment 12a absent from display 10b. It can be seen that in this case the display 10b still provides an easily understood indication of the deviation from the level position, even without the presence of the central segment 12a. In this case the level position is shown by the illumination of only the central segment 12a. Also illustrated in this embodiment are direction of rotation arrows 14a, 14b indicating (as in U.S. Pat. No. 5,713,313) in which direction the level is to be rotated to achieve level (or plumb).

It is to be understood that the central segment 12a and the inclination segments 12b, 12c, 12d, 12e (as well as the other elements of display 10) may be provided by any type of display such as an LCD display, an LED display, or illuminated segments using other forms of illumination. In the context of the present application, "illuminated" refers to the presence of the displayed object (the segment being "on"); thus in the case of an LCD display as shown here, the "illuminated" portion is actually darker (as shown in FIG. 1C) than are the "non-illuminated" portions.

Also provided (FIG. 1A) is out of calibration indicator 22 (including a calibration step indicator) which by illuminating one or more of the four triangles incorporated therein indicates that the device has invalid calibration at that particular inclination and hence that valid information cannot be shown by the fan-like display inclination segments. Also, indicator 22 includes the numerals "1" and "2" (not shown) for indicating the first and second calibration steps as in U.S. Pat. No. 5,313,713, incorporated herein by reference. (It is to be understood that in one embodiment all the inclination segments 12b, 12c, 12d, 12e indicate a maximum indication of deviation from null of e.g. only ⅛ of an inch per linear foot.)

Loudspeaker icon 16 conventionally indicates activation and volume level of the tone generator.

It is to be understood that the above described visual indications may be provided by a number of different electronic circuitry arrangements, one of which is described hereinafter.

Circuitry

Figures 2, 2B:
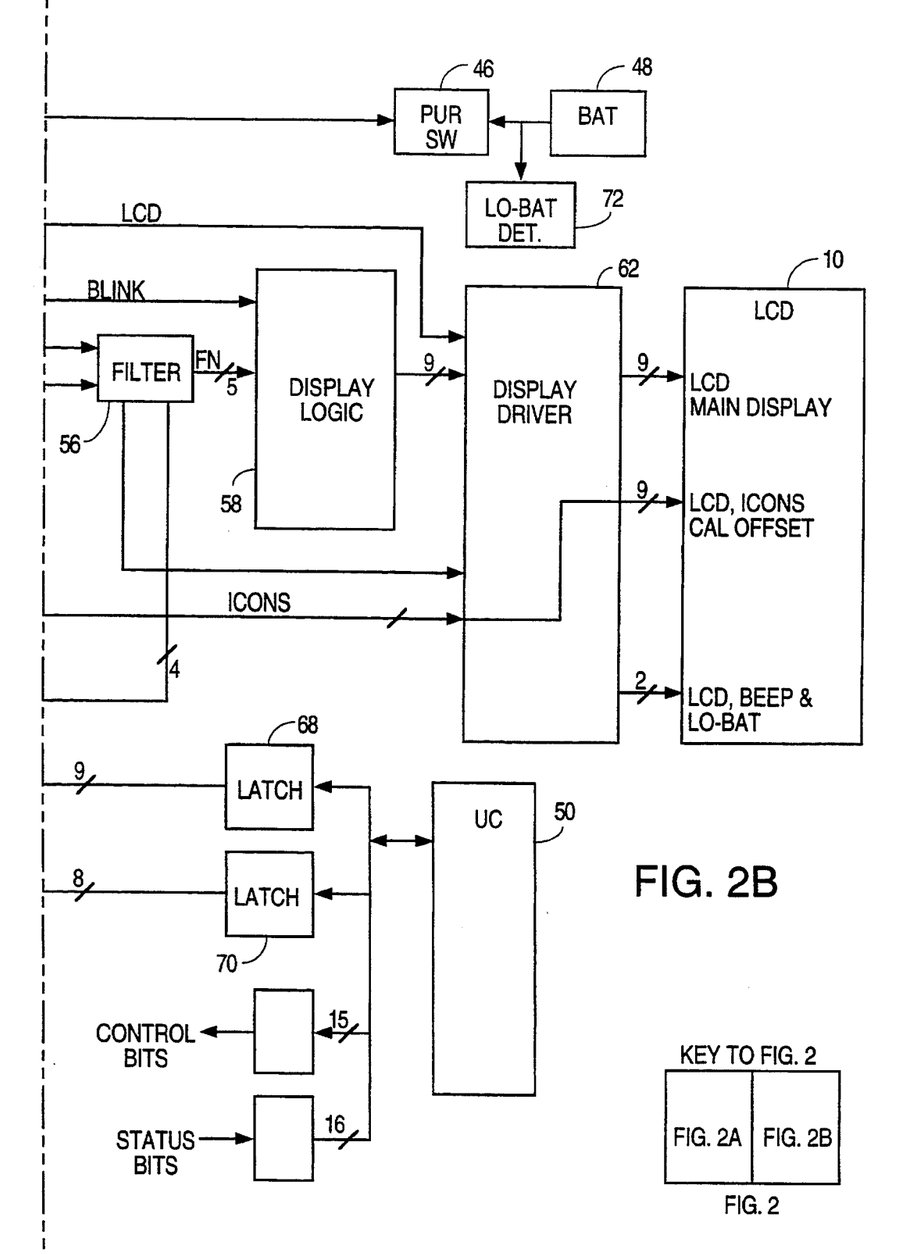
FIG. 2 shows a block diagram of circuitry in accordance with the invention.
Figure 2A:
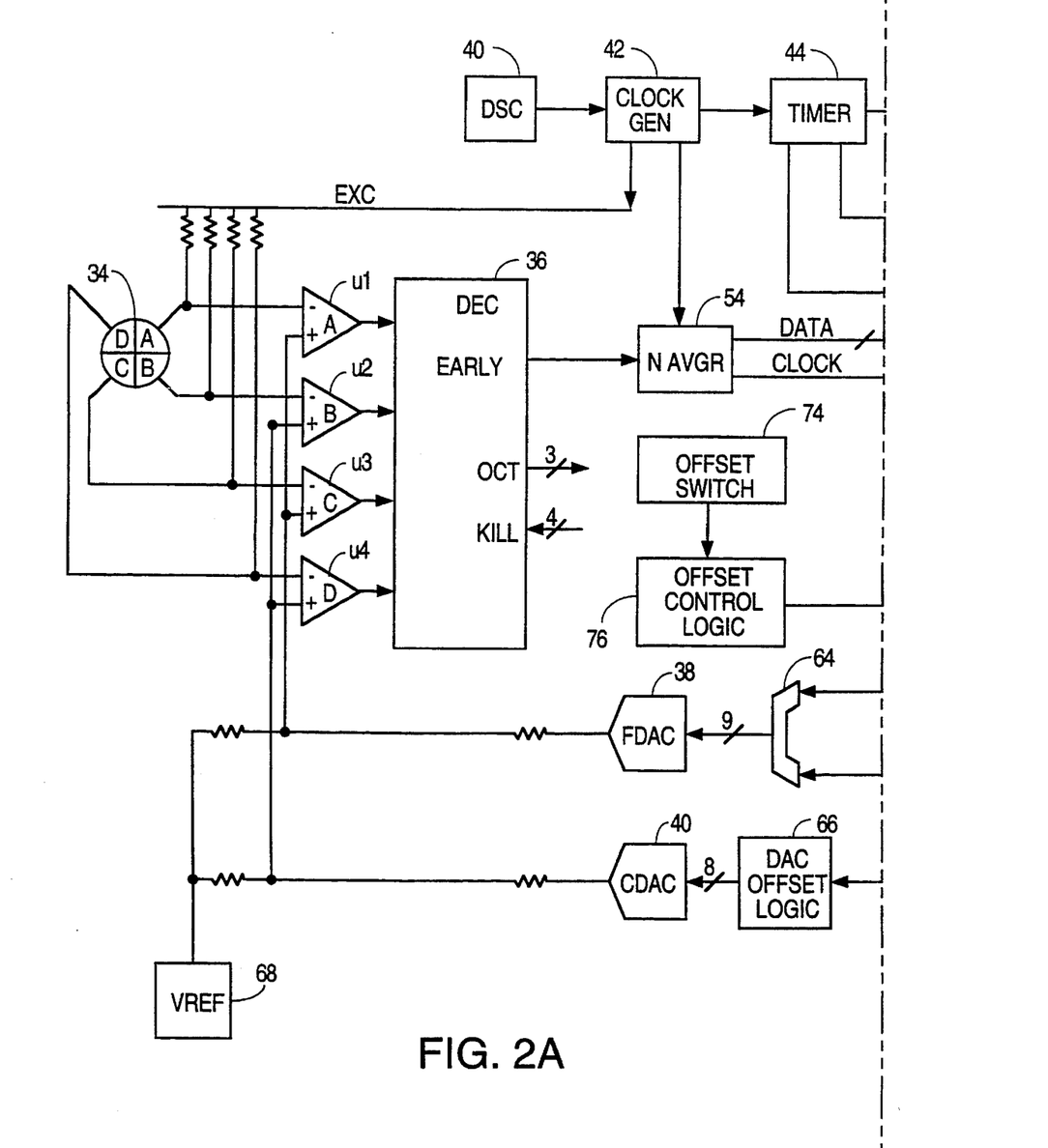

The following description of electronic circuitry is of one embodiment of the invention and provides a rapidly responding visual display and tone processing, with accurate indication of inclination. A combination of an application specific integrated circuit (ASIC) including logic circuitry, and a programmed microcontroller is utilized for the electronic portions of the level in one embodiment, a block diagram of which is shown in FIG. 2. It is to be understood that one of ordinary skill in the art could code the microcontroller computer program in light of the detailed operating steps described hereinafter. Another version of circuitry suitable for use in the present level is described in detail in U.S. Pat. No. 5,313,713.

The four exponential R-C timing signals from the sensor 34 electrodes A to D are processed by respectively conventional comparators U1, U2, U3, U4 (as described in U.S. Pat. No. 5,083,383), utilizing an automatic electrode selection technique. The reference voltage for each pair of diagonally opposed comparators U1, . . . , U4 is derived from two digital-to-analog converters (DAC's) 38, 40 with sensor comparators U1 and U3 driven by a 9 bit DAC 38 called FDAC (fine DAC) and electrode comparators U2 and U4 driven by an 8 bit DAC 40 called CDAC (coarse DAC).

Each DAC 38, 40 receives its digital data input from a latch circuit respectively 68, 70 for retaining the digital data, and whose outputs are connected to an R-2R DAC resistor network to derive the analog voltage.

The output signals from comparators U1, U2, U3 and U4 associated respectively with sensor quadrants (electrodes) A, B, C, D are provided to sensor decoder logic (DEC) circuitry 36. This performs the octant decoding function as described below. Decoder circuitry 36 provides two outputs; the single bit "early/late" clock signal ("Early") and the 3 bit octant indicator ("Oct"), N averager 54 averages as described below the sensed inclination Early signal over N time periods. Averager 54 provides two output signals; one is a "Data" signal indicating the averaged inclination value as an 1 bit value, and a Clock signal. Both the Data signal and Clock signal are provided to the moving average filter circuitry 56 described in detail below. The output signal of the moving average filter 56 is a 5 bit value FN provided to display logic 58.

Shown at the top portion of FIG. 2 is conventional battery 48 connected via a power switch 46 to provide power. A conventional low battery detection circuit 72 is connected to battery 48. Also shown is conventional oscillator 40 which drives a clock generator 42 which in turn drives timer circuit 44 which provides timing for the LCD display driver circuitry 62 (signal "LCD") and also a "Blink" signal which is the timing signal for the display logic 58. The clock generator 42 also provides the excitation signal on line EXC to four resistors for providing the excitation voltage to each of the sensor electrodes A, B, C, and D. The timer 44 is also connected to the power switch 46 in order to turn the power off if the level is inactive for a particular amount of time.

Display logic 58 provides the display/tone processing functions described below and drives (via a 9 bit bus) the conventional display driver circuitry 62. The display driver circuitry 62 also receives the "icons" multi-bit input signal from the offset control logic 76, the beep control signal, the low battery detector signal, and an output signal FN from the filter 56. The 5 bit filter 56 signal FN can have 32 states. Seventeen of these states are used and encoded into nine segments of display 10 using a weighting process, disclosed below.

The conventional LCD 10 includes the "LCD" main display fan-like display segments 12a, 12b, 12c, 12d, 12e. The LCD 10 also includes the "LCD Icons" segments as described above for calibration ("Cal"), for the user/fixed offset modes ("Offset") and other segments for the "Beep" (loudspeaker) and low battery ("LO-BAT") indications as shown in FIG. 2.

The lower portion of FIG. 2 shows the conventional 8 bit microcontroller 50 connected conventionally by a bidirectional serial I/O circuit (not shown) to latches 68 and 70. Latch 68 is connected (via adder 64 which adds the output of latch 68 to the output of filter 56) to the fine digital to analog converter 38 (FDAC).

Similarly, latch 70 is connected via digital to analog converter offset logic 66 (the operation of which is described below) via an 8 bit bus to the 8 bit coarse digital to analog converter CDAC 40.

The FDAC 38 and CDAC 40 drive respectively (via a four resistor network) the positive input terminals of respectively comparators U1 and U3 and comparators U2 and U4. Voltage supply Vref supplies a voltage equal to one-half the system supply. Both the CDAC and FDAC can, via the resistor network, slightly modify the − (minus) input terminal voltages to the comparators.

The 15 control bits from microcontroller 50 perform the functions of enabling/disabling the display calibration icon 22 and associated numerals 1 and 2 (i.e., the "Icons" signal input to the display driver circuitry), and provide the sensor "KILL" signal for the user offset mode (described below). The 16 status bits input to microntroller 50 provide an indication so the microcontroller can monitor functions including the calibration process, the Early signal, and the averager output signal.

Averaging

The output of the sensor decoder logic circuitry 36 will be a binary "1" or "0" after the sensor excitation pulse provided on line EXC, depending upon the orientation of sensor 34.

To help remove system noise, the result of a number of excitation pulses are averaged by averager 54. In one version the number of cycles N averaged is 64, with the following criteria: if the number of accumulated "1"'s is less than 16 over a 64 cycle period, the averaged data is a "0"; if the accumulated "1"'s is greater than 48 the average data is a "1"; if the accumulated "1"'s is between 16 and 48 the previous averaged data result will be used. This allows a 50% "noise band" to exist suppressing small physical (motional) and system noise.

Averaging Calibration

In normal mode operation (indicate level/plumb), the CDAC 40 digital value is fixed at half scale by microcontroller 50 of FIG. 2 by writing the value 80 hex into the CDAC latch 70. During user calibration for any given axis (Level, Plumb, etc.) the FDAC 38 is cycled by microcontroller 50 in a successive approximation routine (SAR) starting with the most significant bit (MSB) and the 9 bit result is temporarily stored by the microcontroller 50. The level is then rotated 180° in the plane of the current working surface by the user and the FDAC 38 again cycled through the SAR and the result temporarily stored. These two temporary results are then averaged via a conventional math routine in the microcontroller 50 to ascertain their mean value. This mean value is then conventionally stored in non-volatile memory associated with microcontroller 50 (not shown) and becomes the calibration word (value) for the particular axis calibrated.

This routine is repeated for each of the four primary axes of the level.

The calibration arrows (triangles) of icon 22 of FIG. 1A indicate each axis calibration status:

solid on: not calibrated blinking: calibration in process off: calibrated

In addition to the calibration arrows, a numeral 1 or 2 (not shown) in icon 22 is displayed during the calibration cycle to alert the user to the calibration step in process i.e.:

"1": first cal step

"2": second cal step

After the calibration cycle for any axis is complete, both numerals 1 and 2 of icon 22 are extinguished.

Octant Decoding

Figure 4A:
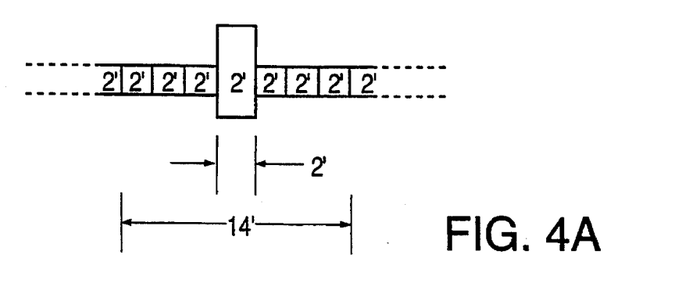
FIGS. 4A and 4B show non-linear display processing in accordance with the invention.
Figure 4B:
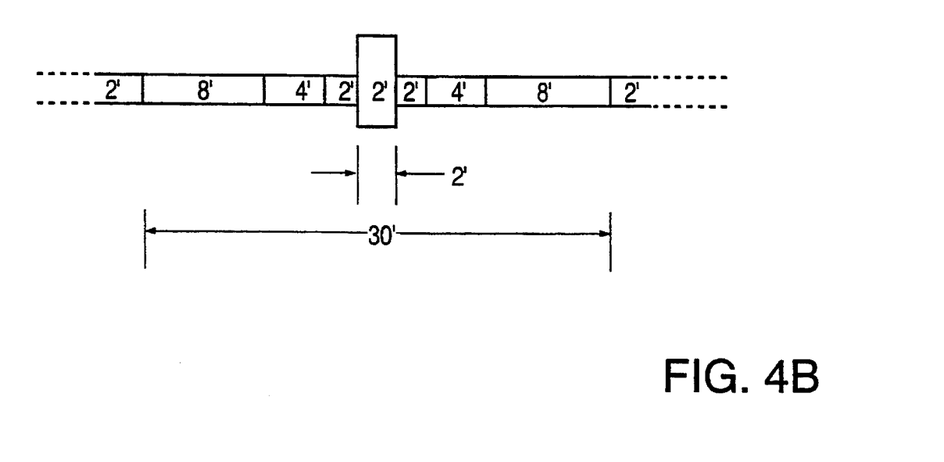

The output signals of the four sensor comparators U1, ..., U4 are decoded by decoder logic 36 to sense the octant within which the sensor 34 is currently oriented. (An example of this decoding is shown in FIGS. 4A and 4B(1) and 4B(2) of U.S. Pat. No. 5,713,313.) Decoding is accomplished by sensing the timing relationships of the four sensor 34 electrodes A, B, C, D. There are eight decoded "zones", each zone being 90° with four zones being in quadrature (45° shifted) from the other four zones.

Display/Tone Processing

Control of the inclination display and available tones is by display logic circuitry 58. After a successful calibration cycle and storage of the calibration word for any particular quadrant, the following sequence occurs:

Initially one starts with the eight bit calibration word from the microcontroller 50, and a value of binary 1000 (8 hex) is added to the calibration word, which represents a "level" display and tone, and the sum of these two values is added in adder 64 resulting in the FDAC binary word (value) sent to the FDAC 38. A value of binary 10 (2 hex) is now added to the FDAC word by the filter 56. Three possible results from these two readings may occur. 1) If the result out of the averager 54 of these two successive data bits is 01, no change in the display/tone occurs and the FDAC word is decremented by 10 binary. 2) If the result is 00, the display is incremented by one segment to the right and the FDAC word incremented by 10 binary. 3) If the result is 11 the display is decremented by one segment and the FDAC word decremented by 10 binary.

This process continues indefinitely, continuously updating the display and tracking the 0/1 null with two successive data pairs of data results. If the FDAC word reaches either ±8 decimal away from the calibrated "level" FDAC word, the FDAC word is not incremented (decremented) any more until the data comes back into a ±8 decimal range of the FDAC calibration word. Each 2 bit wide "bin" of the FDAC word about a ±16 bit range of the calibration word corresponds to a display segment and tone frequency in one embodiment.

Assume that the physical position of the sensor 34 was such that the change in data from a 0 to a 1 occurs when the FDAC word equals the calibration word plus 1000 binary. When the FDAC word is then less than the calibrated word, the averaged data is a 0 until the FDAC word equals the calibration word. Thereafter the averaged data is a 1. This corresponds to a "level" condition and all 8 inclination segments on either side of the central segment would be unilluminated, with only the center level segment illuminated, indicating "level".

If the sensor 34 were now slightly rotated counter-clockwise (CCW), the change in data from a 0 to a 1 would occur earlier in the 16 bin FDAC cycle, and those inclination segments 12c, 12e corresponding to the FDAC bins where data was a 1 would be illuminated. If the sensor 34 was significantly rotated CCW from the "level" position (assuming that the quadrant has not changed) all four display segments in each of groups 12c, 12e would be illuminated. Therefore, nine unique states exist within each quadrant that describe the position of the sensor 34 relative to "level".

In addition, each unique display state is associated with a certain tone from tone generator 60 for audible user feedback, with the exception that when all of the either four right hand or left hand inclination segments indicating maximum inclination are on (illuminated), no tone output occurs. The same set of tone frequencies is used for inclination bars 12b, 12d and for 12c, 12c. (In another embodiment, the tone is provided only for level or plumb; in yet another embodiment, one tone indicates level/plumb and another not level/plumb.)

All four primary quadrants of inclination are similarly treated, with the exception that the averaged data polarity is reversed in the plumb and inverted plumb quadrants. This polarity change is due to the physical relationship of pairs of sensor 34 electrodes A, B, C, D. For example, in the Level quadrant, electrodes B and C are active with B being on the right. But in the plumb quadrant, electrodes A and B are used with B now being on the left. This change from right to left changes the polarity of the resulting data.

Fixed Offset Mode

Both the fixed offset mode and user offset mode are activated by the user via offset switch 74 controlling offset control logic 76. The fixed offset mode is almost identical to the above described "normal" mode, with the exception that it is only valid in the Level quadrant and the CDAC 40 word is changed from range center (80 hex) to some other word, causing an offset to occur.

The DAC Offset Logic 66 when in the Fixed Offset Mode sets one bit out of eight corresponding to the required offset.

MSB

-continued 1 0 0 0 0 0 0 0 = Standard Mode $$\left.\begin{matrix}1\ 0\ 0\ 0\ 0\ 0\ 0\ 1\\ 0\ 1\ 1\ 1\ 1\ 1\ 1\ 1\end{matrix}\right\} \pm 1/8"/1'$$

$$\left.\begin{matrix}1\ 0\ 0\ 0\ 0\ 0\ 1\ 0\\ 0\ 1\ 1\ 1\ 1\ 1\ 0\ 1\end{matrix}\right\} \pm 1/4"/1'$$

$$\left.\begin{matrix}1\ 0\ 0\ 0\ 1\ 0\ 0\ 0\\ 0\ 1\ 1\ 1\ 0\ 1\ 1\ 1\end{matrix}\right\} \pm 1"/1'$$

These bits are manipulated either by local control via offset logic 66 when no microcontroller is present or by the microcontroller 50.

The weighting of each CDAC bit as shown is ⅛"/foot of slope, so that changing the CDAC word by 1 causes a ⅛"/foot offset. The level must now be rotated CW (or CCW) until a new display null or "level" is found. At this point, the level's slope relative to true level is ⅛"/foot off. Thus as shown changing the CDAC word by ±2 (decimal) causes a ¼"/foot offset or by ±8 (decimal) a 1"/foot offset.

Since the level may be operated when inclined either CW or CCW from true level, two displays can exist for any given slope offset (i.e. +¼"/2 feet or −¼"/2 feet). Automatic detection of which side of true level is done by removing the CDAC offset value temporarily, restoring the normal mode CDAC state of 80 hex, and determining on which side of true level the unit is oriented. With this information, the microcontroller can then select the appropriate CDAC offset word and triangle icon for either CW or CCW operation.

User Offset Mode

This mode allows the user to set a "level" display (null) condition anywhere within 360°. Because a "level" or null condition could be set by the user very close to 45° away from true level or plumb, a special condition must be detected and corrected. If the sensor null condition were set at 45° away from true level the sensor plate condition would be such that electrodes A and C would be equally covered by the sensor fluid.

But the octant decoding logic 36 providing the Early signal requires that no opposite pair of electrodes are used together, due to the timing signals from electrode A or electrode B generating the early/late flip-flop's clock signal ("Early" in FIG. 2). Due to this OR'ing function, as the sensor was rotated CW away from the 45° orientation, fluid coverage of electrode A would increase and coverage of electrode B would decrease, causing an increase in the Early signal timing delay. Similarly, if the sensor 34 were rotated CCW from the 45° position, fluid coverage of electrode A would decrease and of electrode B increase, again causing an overall increase in the Early signal delay time. This would result in an increase in the Early signal regardless of the rotation away from 45°, rather than an increase for one rotation direction and a decrease for the other which is what is wanted and what normally occurs.

To correct this, the sensor quadrants are decoded (level/plumb (LP)), (inverted level/plumb (ILP), etc.), and this information is used along with the decoded primary quadrant information to disable one of the two opposite electrodes.

In operation, SAR's in microcontroller 50 for both the CDAC 40 and FDAC 38 are performed and the eight decoded quadrants (primary and quadrature) are then saved by the program of microcontroller 50. Even though the sensor 34 orientation could be very close to 45°, after both SAR's, a unique set of quadrant information will exist due to system noise being less than one LSB (least significant bit) of the FDAC 38. The following Table A shows the various sensor disable conditions along with the encoding of the eight quadrants to accomplish this:

TABLE A

| Range | Quadrant Logic | Sensor Disabled |
|---|---|---|
| 0° to 45° | L·LP | A |
| 45° to 90° | P·LP | C |
| 90° to 135° | P·ILP | D |
| 135° to 180° | IL·ILP | B |
| 180° to 225° | IL·ILIP | C |
| 225° to 270° | IP·ILIP | A |
| 270° to 315° | IP·LIP | B |
| 315° to 0 | L·LIP | D |

One other anomaly occurs while in user offset mode. Extraneous nulls occur at sensor orientations other than the desired position. If the desired null was at 44°, electrode A would be disabled per the foregoing discussion and electrodes B and C would be the active pair determining the null point. The SAR would, for a null at this point, essentially shift the B/D electrode timing via the CDAC 40 output for this to occur. The undesired null points are disabled by only allowing operation of the display in the 0/45° octant by the four bit "KILL" signal to decoder circuitry 36 from microcontroller 50 and either octant on both sides of the 0/45° octant by. This eliminates any ambiguous display.

The logic to accomplish this is two fold. First, the eight quadrants (primary and quadrature) are decoded and stored after the SAR routines. Second, the stored quadrant information is compared in real time to the current operating quadrants. Note that there are always two current, operating quadrants—one primary and one quadrature.

Additional explanation of this logic is provided in U.S. Pat. No. 5,313,713.

Data Filter

A Moving Average Filter 56 is included in the level to further reduce system mechanical noise due to small movements in the level caused by the user. Increasing the number of averaged excitation cycles would reduce this noise, but at the expense of reduced throughput or slower response time. Adding digital filter 56 while retaining the number of averaged cycles advantageously does not slow the response, other than an initial time lag to recognize level rotation that exists longer than two average cycles.

This moving average filter improves on the averaging technique disclosed in U.S. Pat. No. 5,313,713 and above where only a single, historical averaged result is compared to the current result. (It is to be understood that this moving average filter is not essential to operation of the presently disclosed level.)

The moving average filter 56 averages (takes the mean of) the last four FDAC 38 (Fine DAC) codes (the current and most recent last three FDAC digital values) with the result of this average controlling whether the display is incremented CW, CCW or held in the current state. A four bit Up/Down counter (not shown) is embedded in the filter 56, to supply the four bit output to adder 64. This counter increments/decrements the resultant FDAC code as described above and the output signal of the counter is also value d(n) in FIG. 3.

Given the single bit binary output ("DATA") of the averager 54 to be a(n), the FDAC 38 code d(n) is updated as follows:

$$d(n) = \begin{matrix} d(n-1)+1 & \text{if } a(n)=1 \\ d(n-1)-1 & \text{if } a(n)=0 \end{matrix} \quad (1)$$

That is, the FDAC code is incremented by one if the average result is one and decremented by one if the average result is zero.

This is equivalent to:

$$d(n) = d(n-1) + 2a(n) - 1 \quad (2)$$

Averaging the last four FDAC codes gives:

$$f(n) = \frac{d(n) + d(n-1) + d(n-2) + d(n-3)}{4} \quad (3)$$

From Equations (1) and (2):

$$d(n-1) = d(n) - 2a(n) + 1 \quad (4)$$

$$d(n-2) = d(n) - 2a(n) - 2a(n-1) + 2 \quad (5)$$

$$d(n-3) = d(n) - 2a(n) - 2a(n-1) - 2a(n-2) + 3 \quad (6)$$

Substituting (4), (5), and (6) into (3):

$$f(n) = d(n) + \frac{3\overline{a(n)} - 2a(n-1) - a(n-2)}{2} \quad (7)$$

This formula can be implemented in microprocessor/controller 50 by a computer program operating as described above or in logic circuitry.

Figure 3:
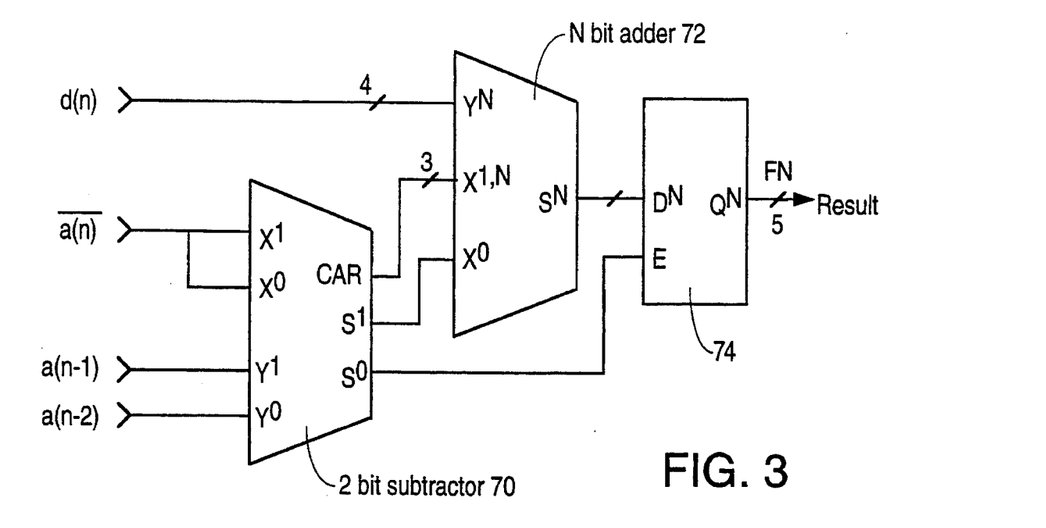
FIG. 3 shows a filtering circuit in accordance with the invention.

A logic circuitry implementation of filter 56 is shown in FIG. 3 using a two bit subtractor (utilizing two's complement addition) 70 having four input terminals receiving values from a shift register (not shown) representing the last three values of the averager output d(n), d(n–1), d(n–2). A three bit result of subtractor 70 (carry, $S^1$, $S^0$, is processed by dropping the LSB (least significant bit $S^0$) to divide by 2 and adding the result to value d(n) in N bit adder 72. Value d(n) is the output signal of the above mentioned four bit up/down counter, the output signal of which is provided to adder 64. The LSB ($S^0$) of the output of subtractor 70 is then used, via an N-bit set of flip-flops 74, to either retain the previous display position (where $S^0$=0) or use the new result $S^N$ from the output of adder 72 (where $S^0$=1) as the output signal F(N) and is provided to display logic 58. The circuitry of FIG. 3 hence serves as an explanation of the computation and is readily embodied in a computer program by one skilled in the art.

WEIGHTED DISPLAY PROCESSING

With display processing such as that described in U.S. Pat. No. 5,313,713, each display segment or "bin" has an identical size (range) as related to the inclination of the level. That is, if each segment has a value of 2 arc minutes of inclination, with a nine segment display as in FIG. 1A the display range is (9–2)×2 arc minutes or 14 arc minutes. This is shown graphically in FIG. 4A where the "level" (center) bin is shown heightened for emphasis.

It is desirable for accuracy to have a level (or plumb) indication having a rather small "window" (e.g., 2 arc minutes), but at the same time, have an overall display range wide enough to be easily used. The previous example of a 14 arc minute display range is very difficult to use in actual practice as being too narrow.

By increasing the number of "bins" and combining certain bins to enable certain display segments, a weighted, or non-linear display is achieved that desirably retains a narrow center window while giving a larger end-to-end overall range.

For example, when seventeen processor "bins" as described above are combined as shown graphically in FIG. 4B, the end-to-end range is increased to 30 arc minutes, while keeping a narrow center window of 2 arc minutes. The result is a doubling of display range while retaining accuracy where it is required, at the center. This function may be carried out by a control program in microprocessor 50 or by logic circuitry (not shown), using the above described processing steps. The resulting display of FIG. 1A has fewer segments than processing bins, with an attendant increase in the ease of use and interpretation.

This disclosure is illustrative and not limiting; further modifications will be apparent to one skilled in the art in light of this disclosure and are intended to fall within the scope of the appended claims.

We claim:

1. An inclination device comprising:
   a sensor determining an inclination of the device relative to a null inclination;
   a housing in which the sensor is mounted, the housing defining a longitudinal axis; and
   a visual display on the housing and operatively connected to the sensor and displaying the determined inclination, the visual display including a plurality of illuminated non-parallel and adjacent segments, each segment representing a predetermined sequential increment of inclination and each segment being arranged at a different angle relative to the longitudinal axis of the housing, a particular number of the segments being illuminated for each determined inclination.

2. The device of claim 1, wherein the plurality of segments defines a fan-like configuration extending on both sides of the longitudinal axis.

3. The device of claim 1, further comprising a mode control operatively connected to the display for operating the display in any of a plurality of modes, each mode establishing said null inclination at a particular inclination relative to the gravitational plane of the earth and each mode being automatically operative at level, plumb, inverted level, and inverted plumb inclinations.

4. The device of claim 3, wherein one of the modes is a user programmable mode whereby a user sets the particular inclination at any arbitrary inclination without changing a position of the sensor relative to the housing.

5. The device of claim 3, the plurality of modes including fixed offset mode, variable offset mode, and normal mode.

6. The device of claim 1, wherein only a central one of the segments is illuminated when the device is at the null inclination, the central segment lying along the longitudinal axis.

7. The device of claim 1, the display further including an indication that the device is out of calibration range when the device has not been calibrated at a particular inclination.

8. The device of claim 4, wherein the display further comprises two right triangle icons, a first of the two icons having its hypotenuse slanting up in a first direction and the second of the two icons having its hypotenuse slanting up in a second direction, the display displaying one or another of the two right triangles for indicating an arbitrary inclination set by a user.

9. The device of claim 1, further comprising an audible indicator of the null inclination connected to the sensor.

10. A method of indicating angular deviation from a particular inclination of a device defining a longitudinal axis, the method comprising the steps of:
    providing on the device a display having a plurality of non-parallel and adjacent segments each segment being arranged at a different angle relative to the longitudinal axis;
    sensing an amount of the angular deviation of the level from a null position;
    illuminating one or more of the segments to indicate each amount of angular deviation of the level, each illuminated segment indicating an incremental deviation of inclination from the null position.

11. The method of claim 10, further comprising the steps of:
    establishing the null position at which the device indicates no inclination; and
    setting the null position to be other than level or plumb relative to a plane perpendicular to a direction of the earth's gravitational field.

12. A moving average filter method of determining inclination, comprising the steps of:
    sensing an inclination for each of a series of time intervals;
    providing an analog signal indicative of the determined inclination for each time interval;
    converting each of the analog signals to a digital signal value;
    finding a current moving average over N of the most recent time intervals, where N is at least 3, of the digital signal values; and
    incrementing an indication of the inclination in response to the current moving average.

13. A weighted display processing method of determining an inclination of a device, comprising the steps of:
    sensing an inclination of the device relative to a null position;
    providing an analog signal indicative of the sensed inclination;
    converting the analog signal to a digital signal value;
    assigning an integral value to the digital signal value, the integral value being dependent on a magnitude of the digital signal, and a maximum of the integral value being N;
    providing a display on the device having N segments, the segments being associated one-to-one with the N integral values; and
    illuminating at least the one of the segments associated with the integral value assigned to the digital signal;
    wherein each integral value corresponds to a predetermined range of digital signal values, and a size of at least one of the predetermined ranges is less than that of another.

14. The method of claim 13, wherein a predetermined range of a digital signal value at the null position is smaller in size than a predetermined range of a digital signal value at an inclination other than the null position.

* * * * *